US005598411A

United States Patent [19]
Matsukawa

[11] Patent Number: 5,598,411
[45] Date of Patent: Jan. 28, 1997

[54] ISDN TERMINAL ADAPTER CAPABLE OF AUTOMATICALLY CHANGING FROM A PACKET SWITCHING MODE TO A CIRCUIT SWITCHING MODE

[75] Inventor: Yoshiki Matsukawa, Tokyo, Japan

[73] Assignee: NEC Corporation, Tokyo, Japan

[21] Appl. No.: 350,999

[22] Filed: Nov. 29, 1994

[30] Foreign Application Priority Data

Dec. 1, 1993 [JP] Japan .................................. 5-329694

[51] Int. Cl.$^6$ .................................................. H04J 3/24
[52] U.S. Cl. ........................ 370/352; 370/466; 370/524
[58] Field of Search ........................... 370/60.1, 58.1,
370/58.2, 79, 110.1, 60, 17, 94.1, 84, 85.13,
85.14, 94.2, 95.1; 340/825.36, 825, 825.03,
825.37; 379/93, 94, 96; 348/13, 16, 17

[56] References Cited

U.S. PATENT DOCUMENTS

| | | | |
|---|---|---|---|
| 4,592,048 | 5/1986 | Beckner et al. | 370/60 |
| 5,157,662 | 10/1992 | Tadamura et al. | 370/60 |
| 5,204,861 | 4/1993 | Wiebe | 370/110.1 |
| 5,208,806 | 5/1993 | Hasegawa | 370/60.1 |
| 5,231,631 | 7/1993 | Buhrke et al. | 370/110.1 |
| 5,381,411 | 1/1995 | Ohno et al. | 370/79 |
| 5,442,630 | 8/1995 | Gagliardi et al. | 370/85.13 |

FOREIGN PATENT DOCUMENTS

| | | |
|---|---|---|
| 340633 | 2/1991 | Japan . |
| 345053 | 2/1991 | Japan . |
| 3101452 | 4/1991 | Japan . |
| 3159444 | 7/1991 | Japan . |
| 3175855 | 7/1991 | Japan . |

*Primary Examiner*—Benedict V. Safourek
*Assistant Examiner*—Ricky Q. Ngo
*Attorney, Agent, or Firm*—Whitham, Curtis, Whitham & McGinn

[57] ABSTRACT

In an ISDN terminal adapter where both data communication by packet switching and data communication by circuit switching can be established, after data communication by packet switching is established, a time when no response is received is counted. When the time exceeds a definite time, data communication by circuit switching is established instead of data communication by packet switching.

19 Claims, 9 Drawing Sheets

ISDN TERMINAL ADAPTER CAPABLE OF AUTOMATICALLY CHANGING FROM A PACKET SWITCHING MODE TO A CIRCUIT SWITCHING MODE

BACKGROUND OF THE INVENTION

1. Field of the Invention

The present invention relates to an integrated service digital network (ISDN) terminal adapter connectable between a terminal and an ISDN, and more particularly, to an ISDN terminal adapter where both data communication by packet switching and data communication by circuit switching can be established.

2. Description of the Related Art

In an ISDN terminal adapter where both data communication by packet switching and data communication by circuit switching can be established, either data communication by packet switching or data communication by circuit switching is selected automatically or manually.

In the prior art, an automatic changing operation is carried out in accordance with the amount of data to be transmitted (see JP-A-HEI3-175855), a call facility (see JP-A-HEI3-159444), a combination of data to be transmitted, a transmission distance and a kind of communication (see JP-A-HEI3-101452), a charge calculated based upon amount of data (JP-A-HEI3-45053), or registered dialing information (JP-A-HEI3-40633).

In the above-mentioned prior art, however, even if a fault is generated in data communication by packet switching, it is impossible to automatically change from data communication by packet switching to data communication by circuit switching. Also, even if a large amount of delay is generated in the transmission of data communication by packet switching, it is impossible to automatically change from data communication by packet switching to data communication by circuit switching. Further, it is impossible to monitor the of transmission speed of data communication by packet switching.

SUMMARY OF THE INVENTION

It is an object of the present invention to provide an ISDN terminal adapter which automatically changes from data communication by packet switching to data communication by circuit switching when a data communication fault is generated in the packet switching mode.

Another an object is to provide an ISDN terminal adapter which automatically changes from data communication by packet switching to data communication by circuit switching when there is a large amount of delay in the transmission of data in the packet switching mode.

Still another object is to provide an ISDN terminal adapter which can monitor the transmission speed of data communication in the packet switching mode.

According to the present invention, in an ISDN terminal adapter where both data communication by packet switching and data communication by circuit switching can be established, after data communication by packet, switching is established, a time when no response is received is counted. When the time exceeds a certain definite time, data communication by circuit switching is established instead of data communication by packet switching.

Also, a time from transmitting a data packet to a time of receiving an acknowledgement of receipt of the data packet is counted. When the time exceeds a definite time, data communication by circuit switching is established instead of the data communication by packet switching.

Further, the time is converted into a data transmission speed which is displayed on a display unit.

BRIEF DESCRIPTION OF THE DRAWINGS

The present invention will be more clearly understood from the description as set forth below, with reference to accompanying drawings, wherein.

DESCRIPTION OF THE PREFERRED EMBODIMENTS

Figure 1:
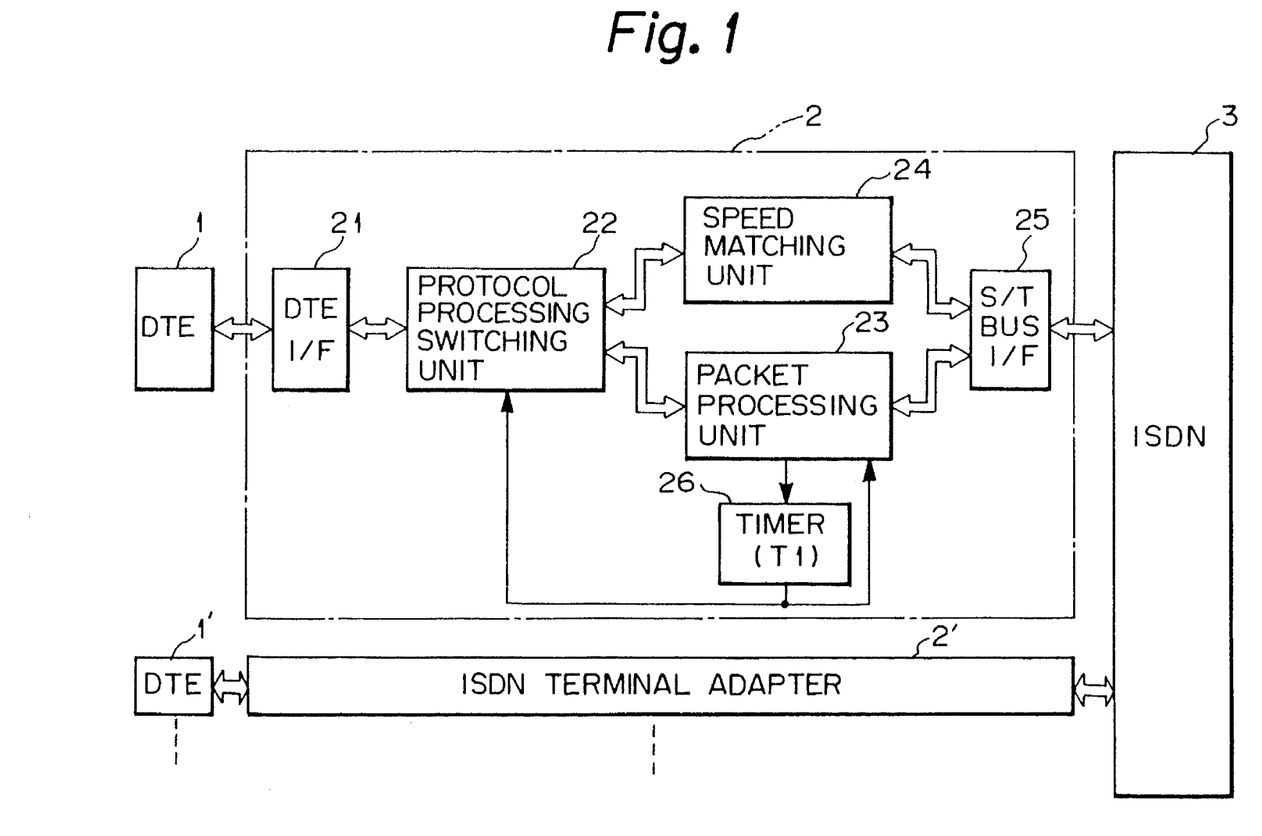
FIG. 1 is a block circuit diagram illustrating a first embodiment of the ISDN terminal adapter according to the present invention.

In FIG. 1, which illustrates a first embodiment of the present invention, reference numeral 1, 1', . . . designate data terminals (DTE's) which are connected via ISDN terminal adapters 2, 2', . . . to an ISDN 3. That is, the ISDN terminal adapters 2, 2', . . . carry out data transmissions between the terminals 1, 1', . . . and the ISDN 3.

The ISDN terminal adapter such as 2, is includes a DTE interface 21 with the terminal 1, a protocol processing switching unit 22, a packet processing unit 23 for a packet switching mode, a speed matching unit 24 for a circuit switching mode, and an S/T bus interface with the ISDN 3. Either the packet processing unit 23 or the speed matching unit 24 is selected by the protocol processing switching unit 22. In other words, either the data communication by packet switching or the data communication by circuit switching is selected by the protocol processing switching unit 22.

Also, the ISDN terminal adapter 2 includes a timer 26 for counting time where no response is received. That is, the timer 26 counts a time where no response is received, after data communication by packet switching has been established. As a result, when the time of the timer 26 exceeds a definite time T1, the timer 26 controls the protocol processing switching unit 22 to select the speed matching unit 24.

Figure 2:
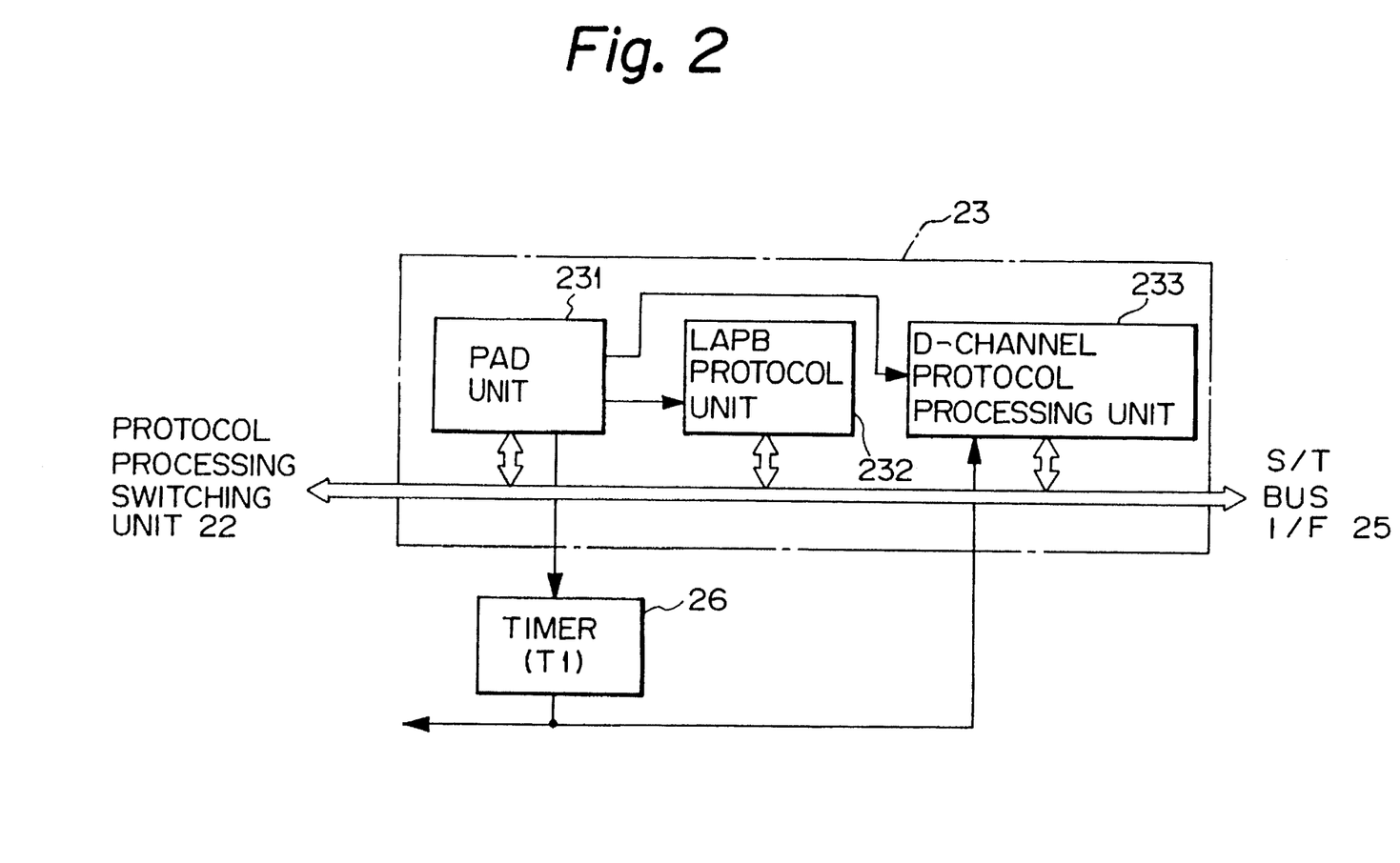
FIG. 2 is a detailed block circuit diagram of the packet processing unit of FIG. 1.

The packet processing unit 23 is explained next in detail with reference to FIG. 2. That is, the packet processing unit 23 includes a packet assembly disassembly (PAD) unit 231, a link access protocol balanced (LAPB) protocol unit 232, and a D-channel protocol processing unit 233. In this case, the LAPB protocol unit 232 is used for processing data packets in a B-channel packet switching mode, and the D-channel protocol processing unit 233 is used for linking with the ISDN 3 and for processing data packets in a D-channel packet switching mode. The PAD unit 231 can includes a microcomputer (not shown) including a central processing unit (CPU), a read-only memory (ROM), a random access memory (RAM), and the like, to control the LAPB protocol unit 232 and the D-channel protocol unit 233 as well as the timer 26.

The operation of the system of FIG. 1 will be explained next with reference to FIGS. 3 and 4.

Figure 3:
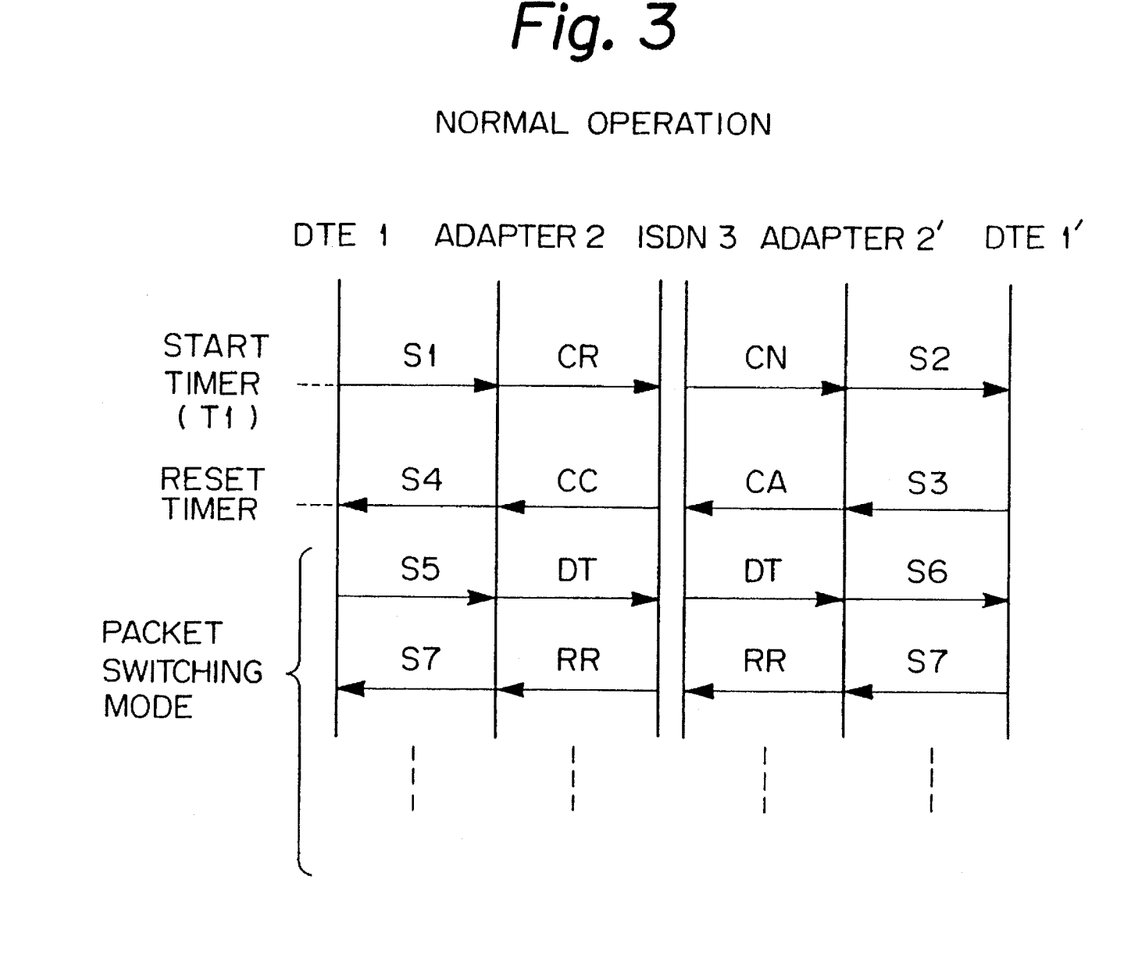
FIGS. 3 and 4 are sequence diagrams showing the operation of the system of FIG. 1.

Referring to FIG. 3 which shows a normal operation of the system of FIG. 1, first, the terminal 1 generates a call signal S1 and transmits it to the ISDN terminal adapter 2. Then, the interface 21, the protocol processing switching unit 22, the packet processing unit 23 (in this case, the D-channel protocol processing unit 233), and the interface 25 of the ISDN terminal adapter 2 generate a call request (CR) packet and transmit it to the ISDN 3. Simultaneously, the PAD unit 231 starts the timer 26. In this case, note that the packet switching mode is initially selected in the ISDN terminal adapter 2 by the protocol processing switching unit 22 thereof. As a result, the ISDN 3 transmits an incoming call (CN) packet to the ISDN terminal adapter 2'. Then, in the ISDN terminal adapter 2', the S/T bus interface, the packet processing unit (in this case, the D-channel protocol processing unit), the protocol processing switching unit and the DTE interface generate an incoming call signal S2 and transmit it to the terminal 1'. Also, in this case, note that the packet switching mode is initially selected in the ISDN terminal adapter 2' by the protocol processing switching unit 22 thereof.

Next, the terminal 1' generates a response signal S3 and transmits it to the ISDN terminal adapter 2'. Then, in the ISDN terminal adapter 2', the DTE interface, the protocol processing switching unit, the packet processing unit (in this case, the D-channel protocol processing unit) and the S/T bus interface generate a call accepted (CA) packet and transmit it to the ISDN 3. Then, the ISDN 3 transmits a call connected (CC) packet to the ISDN terminal adapter 2. Then, In the ISDN terminal adapter 2, the S/T bus interface 25, the packet processing unit 23 (in this case, the D-channel protocol processing unit 233), the protocol processing switching unit 22 and the DTE interface 21 generate an incoming signal S4 and transmit it to the terminal 1. Simultaneously, the PAD unit 231 resets the timer 26. In this case, the timer 26 is reset before the timer 26 counts the time T1, and therefore, the timer 26 generates no control signal.

Thereafter, data communication by packet switching is established. That is, the terminal 1 transmits a data signal S5, so that the ISDN terminal adapter 2 (the IAPB protocol unit 232 or the D-channel protocol processing unit 233, and the PAD unit 231) assembles a data packet DT and transmits it to the ISDN. 3. Then, the ISDN 3 transmits the data packet DT to the ISDN terminal adapter 2', so that the ISDN terminal 2' (the LAPB protocol unit or the D-channel protocol processing unit 233, and the PAD unit 231) disassembles the data packet DT and transmits it to the terminal 1'. Similarly, the ISDN terminal adapter 2 (the LAPB protocol unit or the D-channel protocol processing unit) assembles a data reception and response (RR) packet and transmits it to the ISDN 3. Then, the ISDN 3 transmits the RR packet to the ISDN terminal adapter 2.

Figure 4:
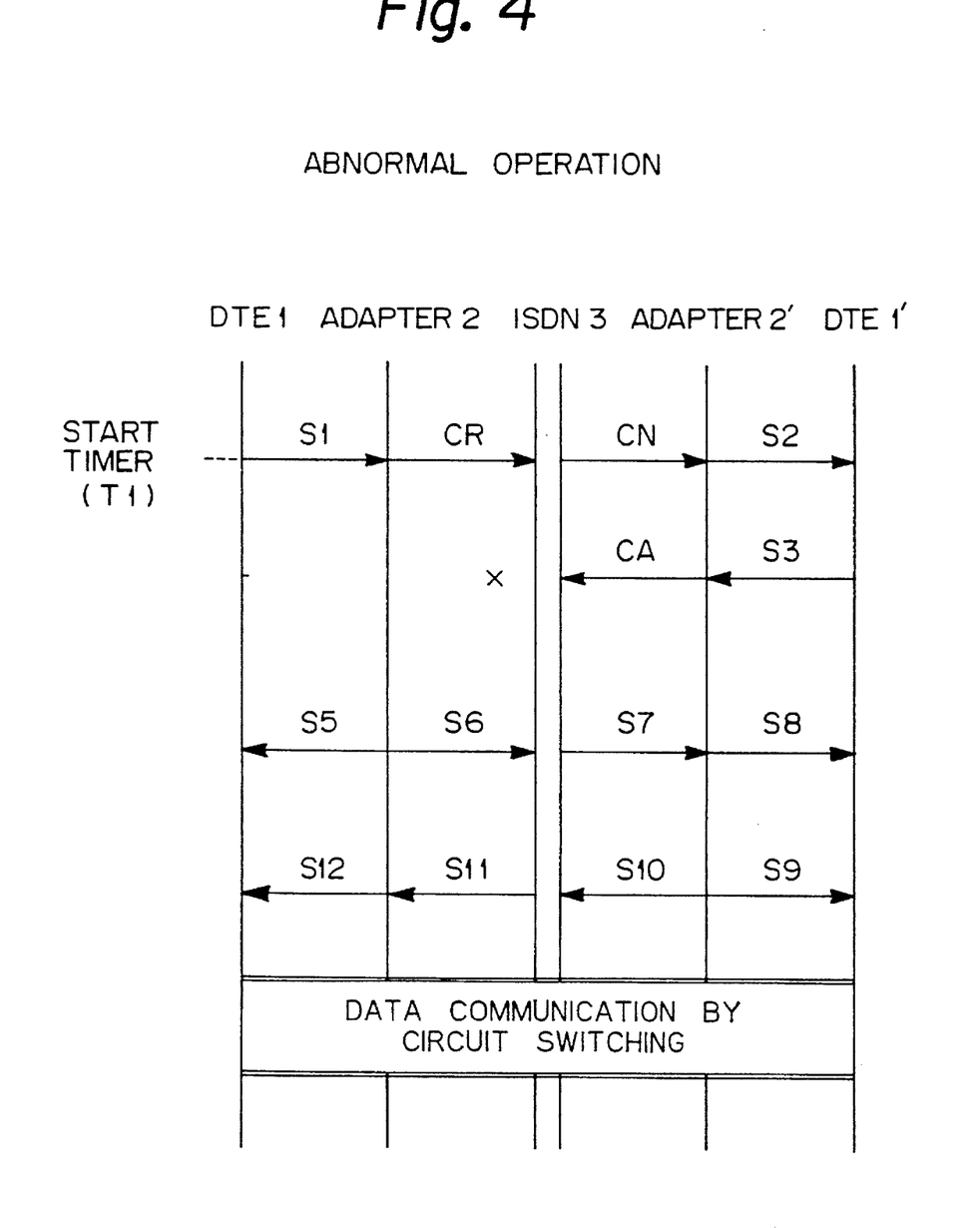

Referring to FIG. 4 which shows an abnormal operation of the system of FIG. 1, in the same way as in FIG. 3, the terminal 1 generates a call signal S1 and transmits it to the ISDN terminal adapter 2. Then, the interface 21, the protocol processing switching unit 22, the packet processing unit 23 (in this case, the D-channel protocol processing unit 233), and the interface 25 of the ISDN terminal adapter 2 generate a CR packet and transmit it to the ISDN 3. Simultaneously, the PAD unit 231 starts the timer 26. In this case, note that the packet switching mode is initially selected in the ISDN terminal adapter 2 by the protocol processing switching unit 22 thereof. As a result, the ISDN 3 transmits a CN packet to the ISDN terminal adapter 2'. Then, in the ISDN terminal adapter 2', the S/T bus interface, the packet processing unit (in this case, the D-channel protocol processing unit), the protocol processing switching unit and the DTE interface generate an incoming call signal S2 and transmit it to the terminal 1'. Also, in this case, note that the packet switching mode is initially selected in the ISDN terminal adapter 2' by the protocol processing switching unit 22 thereof.

Next, the terminal 1' generates a response signal S3 and transmits it to the ISDN terminal adapter 2'. Then, in the ISDN terminal adapter 2', the DTE interface, the protocol processing switching unit, the pocket processing unit (in this case, the D-channel protocol processing unit) and the S/T bus interface generate a CA packet and transmit it to the ISDN 3. At this time, assume that the ISDN 3 cannot generate a CC packet for some reason, or the ISDN terminal adapter 2 cannot receive a CC packet for some reason. In this case, the timer 26 counts the time T1. As a result, the timer 26 generates a switching request signal and transmits it to the protocol processing switching unit 22 to select the speed matching unit 24 instead of the packet processing unit 23. Simultaneously, the timer 26 transmits the switching request signal to the D-channel protocol processing unit 233, thus changing from data communication by packet switching to data communication by circuit switching.

Next, the ISDN terminal adapter 2 (the speed matching unit 24 and the D-channel protocol processing unit) generates a calling signal S5 and transmits it to the terminal 1, and simultaneously, generates a calling signal S6 in the circuit switching mode and transmits it to the ISDN 3. Then, the ISDN 3 transmits an incoming call signal S7 to the ISDN terminal adapter 2'. The ISDN terminal adapter 2' then transmits an incoming call signal S8 to the terminal 1'.

Next, the terminal 1' return a response signal S9 to the ISDN terminal adapter 2'. Then, the ISDN terminal adapter 2' (the speed matching unit and the D-channel protocol processing unit) generates a response signal S10 and transmits it to the ISDN 3. Next, the ISDN 3 transmits a response signal S11 to the ISDN terminal adapter 2, and the ISDN terminal adapter 2 then transmits an incoming call signal S12 to the terminal 1.

Thereafter, data communication by circuit switching is established.

Figure 5:
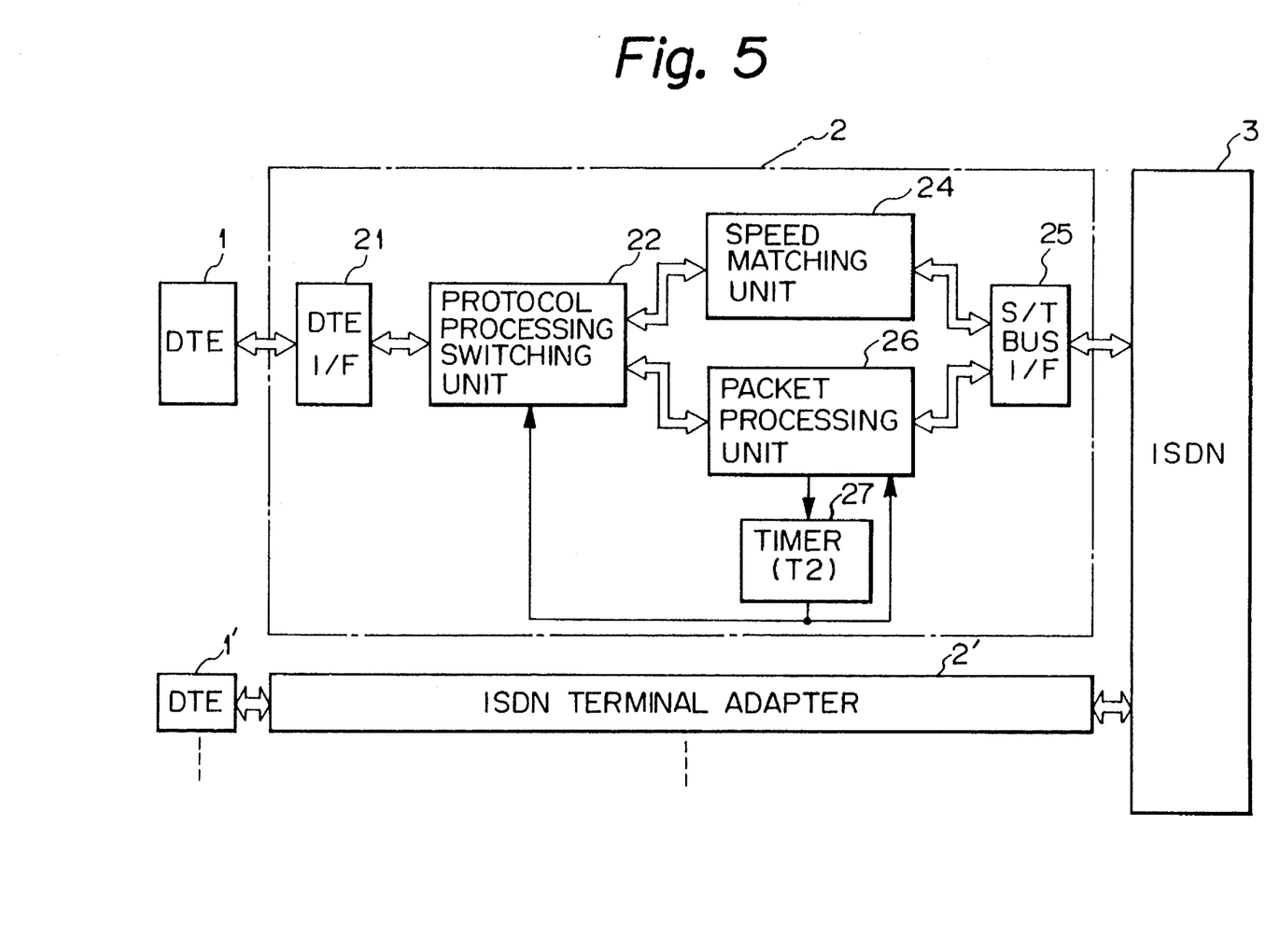
FIG. 5 is a block circuit diagram illustrating a second embodiment of the ISDN terminal adapter according to the present invention.

In FIG. 5, which illustrates a second embodiment of the present invention, a timer 27 is provided instead of the timer 26 of FIG. 1. The timer 27 is used for counting the time of a delay in data transmission when data communication by packet switching is established. That is, the timer 27 counts a time from transmitting a data packet to a time of receiving an acknowledgement of receipt of the data packet.

When the system of FIG. 5 is normal, the operation thereof is substantially the same as that as shown in FIG. 3.

An abnormal operation of the system of FIG. 5 will be explained next with reference to FIG. 6.

Figure 6:
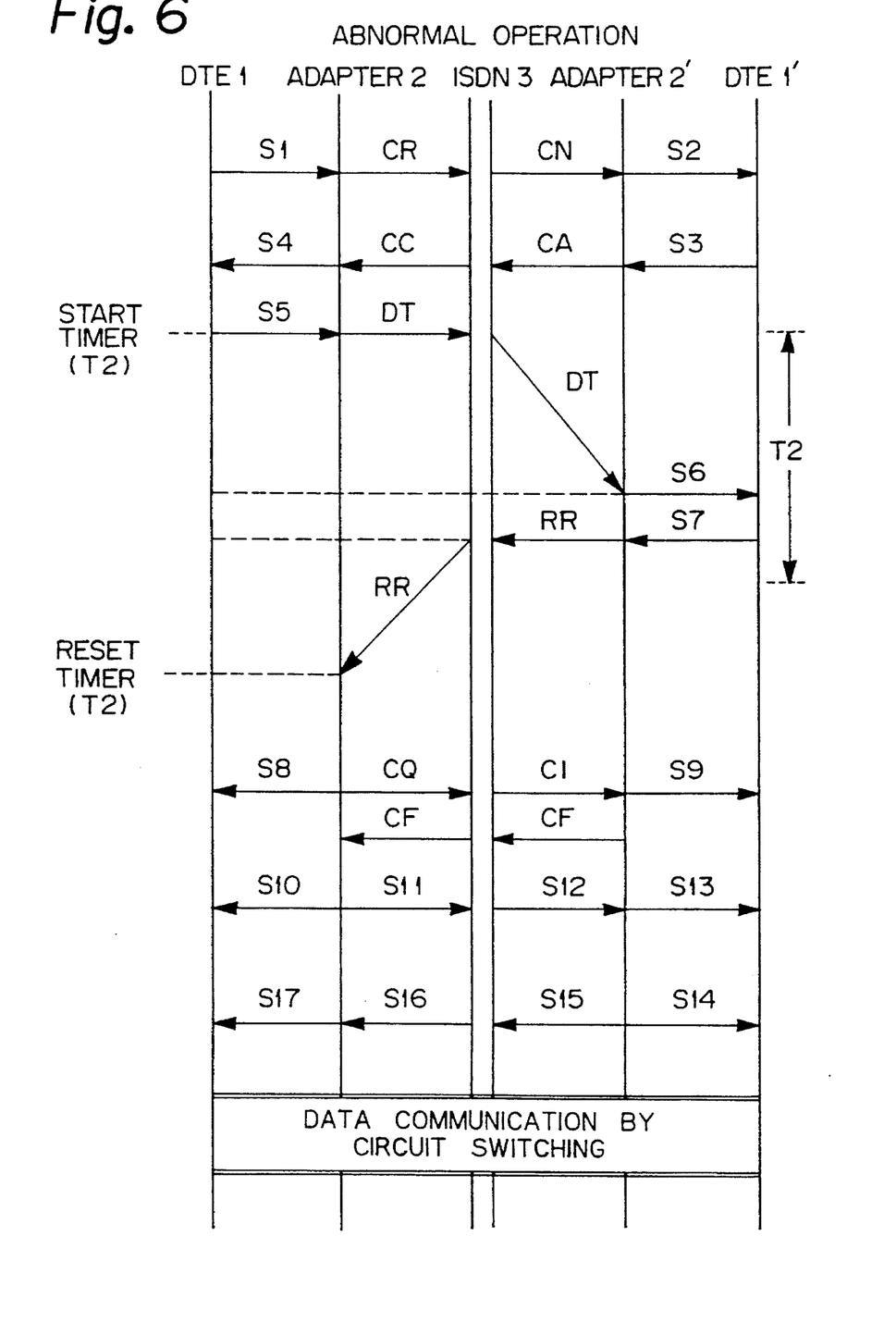
FIG. 6 is a sequence diagram showing the operation of the system of FIG. 5.

In FIG. 6, first, the terminal 1 generates a call signal S1 and transmits it to the ISDN terminal adapter 2. Then, the interface 21, the protocol processing switching unit 22, the packet processing unit 23 (in this case, the D-channel protocol processing unit 233), and the interface 25 of the ISDN terminal adapter 2 generate a CR packet and transmit it to the ISDN 3. In this case, note that the packet switching mode is initially selected in the ISDN terminal adapter 2 by the protocol processing switching unit 22 thereof. As a result, the ISDN 3 transmits a CN packet to the ISDN terminal adapter 2'. Then, in the ISDN terminal adapter 2', the S/T bus interface, the packet processing unit (in this case, the D-channel protocol processing unit), the protocol processing switching unit and the DTE interface generate an incoming call signal S2 and transmit it to the terminal 1'. Also, in this case, note that the packet switching mode is initially selected in the ISDN terminal adapter 2' by the protocol processing switching unit 22 thereof.

Next, the terminal 1' generates a response signal S3 and transmits it to the ISDN terminal adapter 2'. Then, in the ISDN terminal adapter 2', the DTE interface, the protocol processing switching unit, the packet processing unit (in this case, the D-channel protocol processing unit) and the S/T bus interface generate a CA packet and transmit it to the ISDN 3. Then, the ISDN 3 transmits a CC packet to the ISDN terminal adapter 2. Next, in the ISDN terminal adapter 2, the S/T bus interface 25, the packet processing unit 23 (in this case, the D-channel protocol processing unit 233), the protocol processing switching unit 22 and the DTE interface 21 generate an incoming signal S4 and transmit it to the terminal 1. Thereafter, data communication by packet switching is established. That is, the terminal 1 transmits a data signal S5, so that the ISDN terminal adapter 2 (the LAPB protocol unit 232 or the D-channel protocol processing unit 233) assembles a data packet DT and transmits it to the ISDN 3. Simultaneously, the PAD 231 starts the timer 27. Then, the ISDN 3 transmits the data packet DT to the ISDN terminal adapter 2', so that the ISDN terminal 2' (the LAPB protocol unit or the D-channel protocol processing unit) disassembles the data packet DT and transmits it to the terminal 1'. Similarly, the ISDN terminal adapter 2' (the LAPB protocol unit or the D-channel protocol processing unit) assembles an RR packet and transmits it to the ISDN 3. Then, the ISDN 3 transmits the RR packet to the ISDN terminal adapter 2. At this time, although the timer 27 is reset by the PAD unit 231, the timer 27 has already counted the time T2.

Therefore, the timer 27 generates a switching request signal and transmits it to the protocol processing switching unit 22 to select the speed matching unit 24 instead of the packet processing unit 23. Simultaneously, the timer 27 transmits the switching request signal to the D-channel protocol processing unit 233, thus changing from data communication by packet switching to data communication by circuit switching.

That is, after the data communication by packet switching is cut, the ISDN adapter 2 generates a packet-mode cut signal S8 and transmits it to the terminal 1, and simultaneously, generates a clear request (CQ) packet and transmits it to the ISDN 3. Then, the ISDN 3 transmits a clear indication (CI) packet the to the ISDN terminal adapter 2' which, in turn, generates a packet-mode cut signal S9 and transmits it to the terminal 1'.

Also, the ISDN terminal adapter 2' generates a clear confirmation (CF) packet and transmits it to the ISDN 3. Then, the ISDN transmits the CF pocket to the ISDN terminal adapter 2.

On the other hand, the ISDN terminal adapter 2 (mainly, the speed matching unit 24 and the D-channel protocol processing unit 233) generates a calling signal S10 and transmits it to the terminal 1, and simultaneously, generates a calling signal S11 in the circuit switching mode and transmits it to the ISDN 3. Then, the ISDN 3 transmits an incoming call signal S12 to the ISDN terminal adapter 2'. The ISDN terminal adapter 2' then transmits an incoming call signal S13 to the terminal 1'.

Next, the terminal 1' returns a response signal S14 to the ISDN terminal adapter 2'. Then, the ISDN terminal adapter 2' (the speed matching unit and the D-channel protocol processing unit) generates a response signal S15 and transmits it to the ISDN 3. Next, the ISDN 3 transmits response signal S16 to the ISDN terminal adapter 2, and the ISDN terminal adapter 2 transmits an incoming call signal S17 to the terminal 1.

Thereafter, data communication by circuit switching is established.

Figure 7:
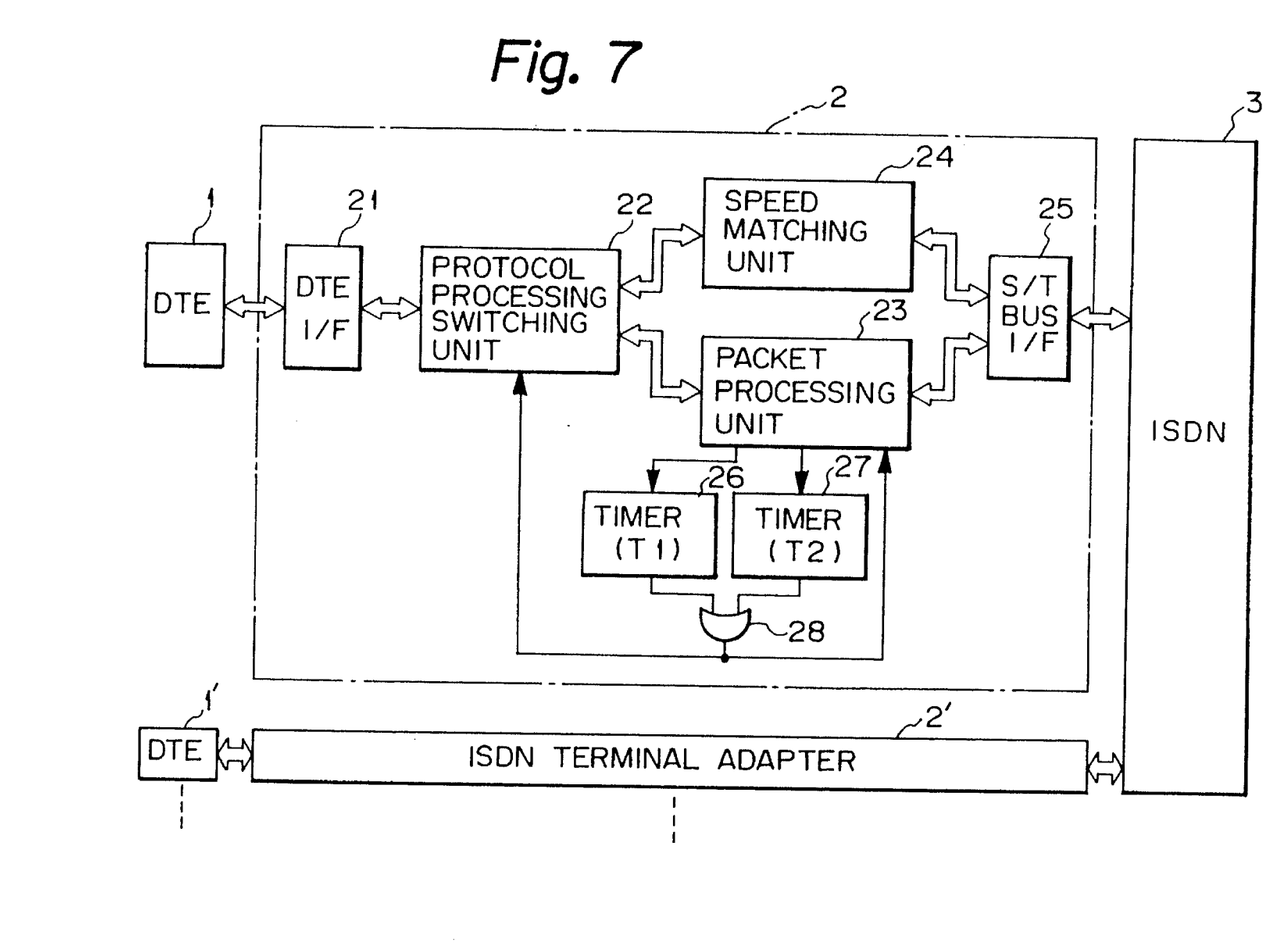
FIGS. 7, 8 and 9 are block circuit diagrams illustrating third, fourth and fifth embodiments, respectively, of the ISDN terminal adapter according to the present invention.

In FIG. 7, which illustrates a third embodiment of the present invention, the first embodiment as illustrated in FIG. 1 is combined with the second embodiment as illustrated in FIG. 5. That is, both of the timers 26 and 27 are connected to the PAD unit 231 (FIG. 2) of the packet processing unit 23, and the outputs of the timers 26 and 27 are connected via an OR circuit 28 to the protocol processing switching unit 22 and the D-channel protocol processing unit 233 (FIG. 2) of the packet processing unit 23. Thus, in a state where data communication by packet switching is established, if a time where no response is received exceeds the definite time T1 or if a time from transmitting a data packet to a time of receiving an acknowledgement of receipt of the data packet exceeds the definite time T2, the data communication by packet switching is switched to the data communication by circuit switching.

Figure 8:
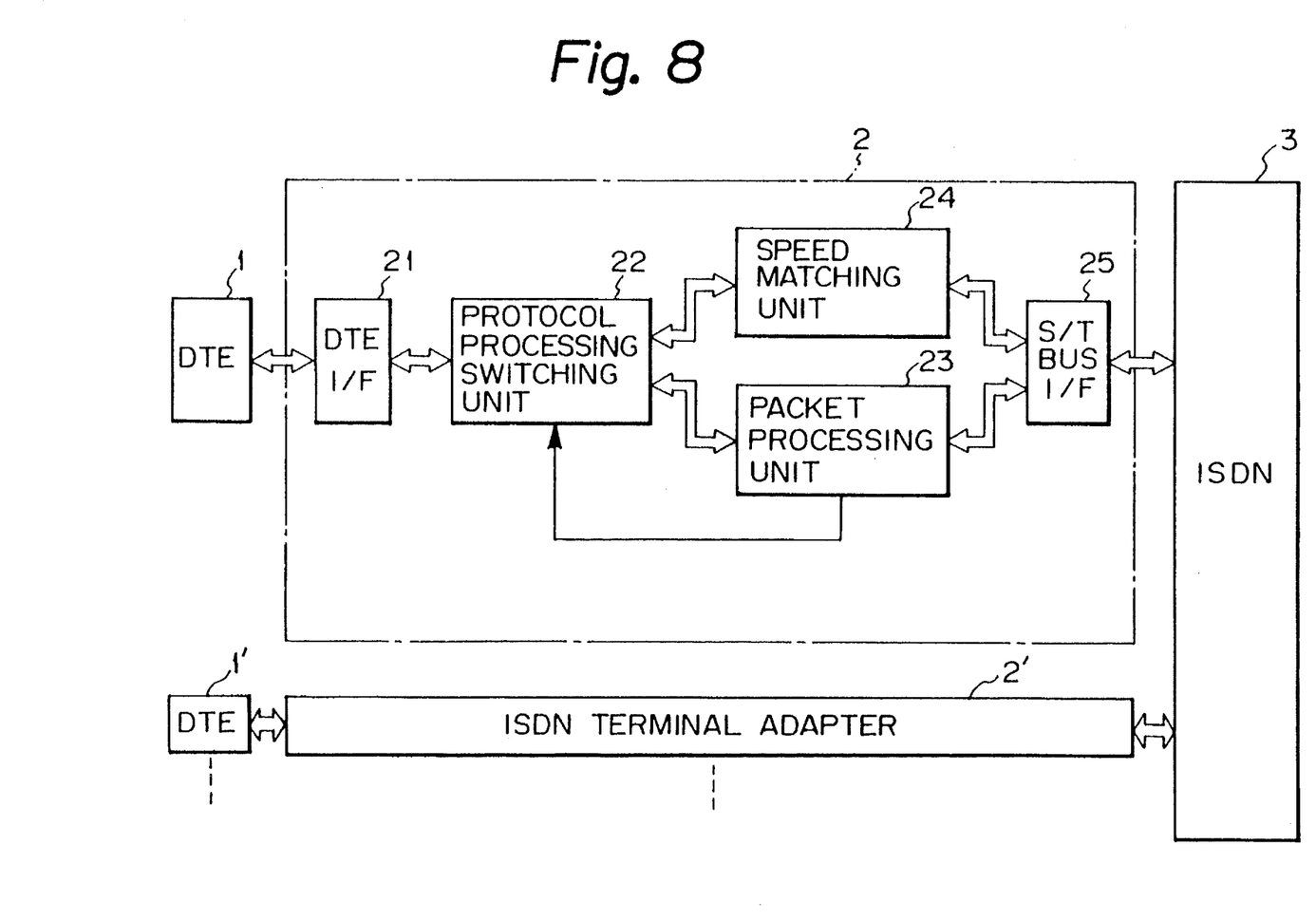

In FIG. 8, which illustrates a fourth embodiment of the present invention, the function of the timers 26 and 27, and the OR circuit 28 of FIG. 7 is incorporated into the PAD unit 231 (FIG. 2) of the packet processing unit 23, and therefore, such hardware is not provided. That is, as explained above, the PAD unit 231 can be constructed by a microcomputer, and therefore, software performing the functions of the timers 26 and 27 is introduced into the ROM of the microcomputer.

Figure 9:
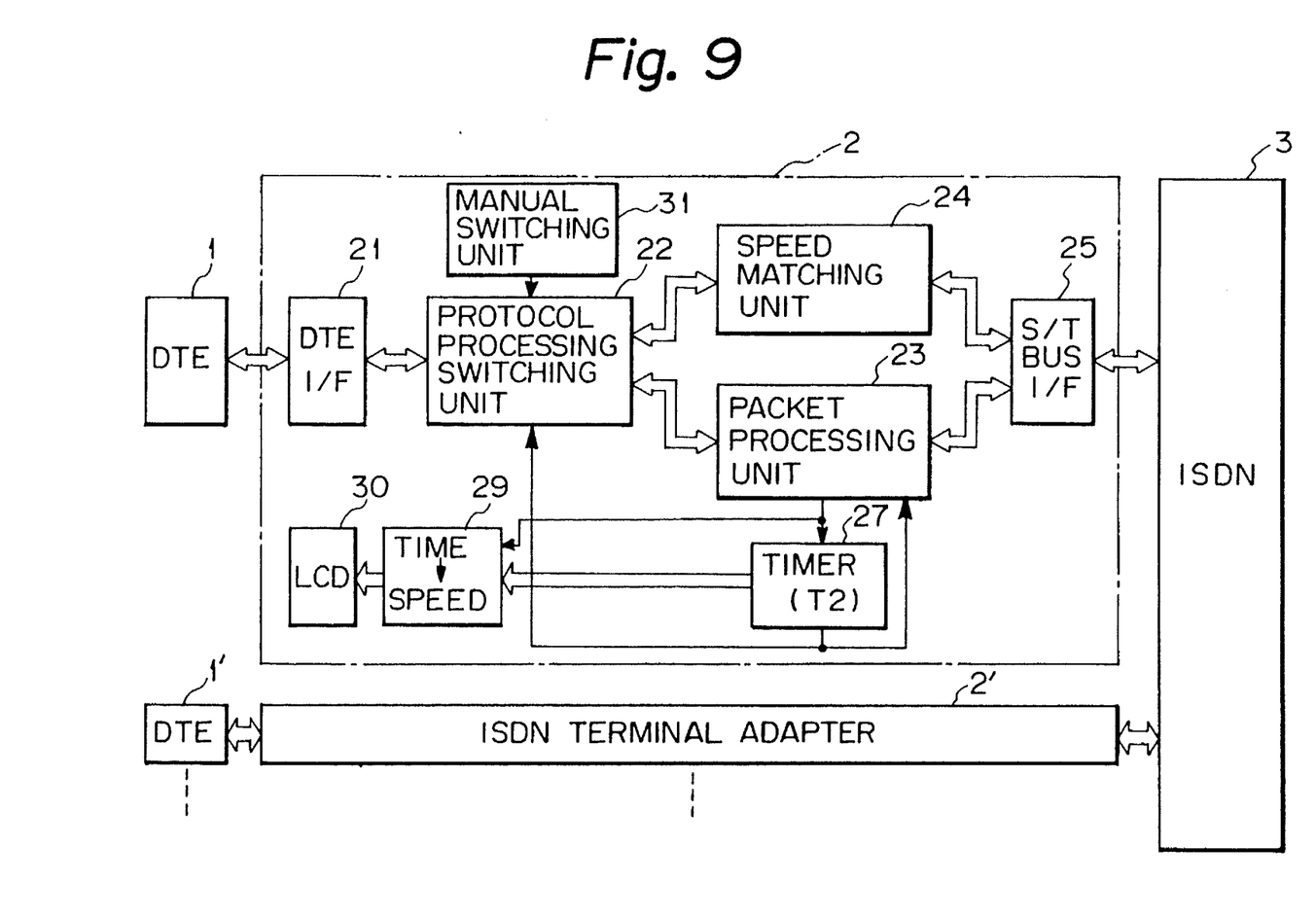

In FIG. 9, which illustrates a fifth embodiment of the present invention, a time-to-speed conversion unit 29, a liquid crystal display (LCD) unit (a light emitting diode (LED) unit or the like) 30, and a manual switching unit 31 are added to the elements of FIG. 5. That is, every time the timer 27 is reset, the content of the timer 27 is converted by the time-to-speed conversion unit 29 into a data transmission speed (rate) which is displayed on the LCD unit 30. Therefore, an operator can monitor the data transmission rate by packet switching. As a result, if the operator determines that the data transmission rate is too slow, the operator can operate the manual switching unit 31, so as to change from data communication by packet switching to data communication by circuit switching. This changing procedure is the same as in the above-mentioned embodiments.

As explained hereinbefore, according to the present invention, when a fault is generated in the data communication by packet switching, or when a large amount of delay occurs in the transmission of data by packet switching, the data communication by packet switching is automatically changed to data communication by circuit switching. Also, the speed (rate) of transmission of data communication by packet switching can be monitored, which is helpful in manually changing the data communication by packet switching to the data communication by circuit switching.

I claim:

1. An integrated service digital network (ISDN) terminal adapter for connecting a terminal and an ISDN, comprising:

packet switching means, operatively connected to said terminal and said ISDN, for establishing data communication by packet switching;

circuit switching means, operatively connected to said terminal and said ISDN, for establishing data communication by circuit switching;

selecting means, operatively connected to said packet switching means and said circuit switching means, for selecting one of said packet switching means and said circuit switching means;

first timer means, operatively connected to said packet switching means for counting a first time period during which no response is received when said packet switching means establishes said data communication by packet switching, said first timer means controlling said selecting means to select said circuit switching means when the first time period exceeds a first value; and second timer means, operatively connected to said packet switching means and said selecting means, for counting a second time period from a first time corresponding to transmitting a data packet to a second time corresponding to receiving an acknowledgment of receipt of the data packet after said packet switching means establishes said data communication by packet switching, said second timer means controlling said selecting means to select said circuit switching means when the second time period exceeds a second value.

2. An adapter as set forth in claim 1, further comprising:

time-to-speed conversion unit, operatively connected to said second timer means for converting the second time period into a speed of data transmission; and display unit, connected to said time-to-speed conversion unit, for displaying the speed of data transmission.

3. An adapter as set forth in claim 2, further comprising manual control unit, operatively connected to said selecting means, for controlling said selecting means.

4. An adapter as set forth in claim 1, wherein said packet switching means comprises packet assembly/disassembly means, operatively connected to said first timer means, for controlling said first timer means.

5. An adapter as set forth in claim 4, wherein said packet switching means further comprises link access protocol balanced processing means, operatively connected to said packet assembly/disassembly means, for processing data packets in a first channel packet switching mode.

6. An adapter as set forth in claim 5, wherein said packet switching means further comprises second channel protocol processing means, operatively connected to said packet assembly/disassembly means, for processing said data packets in a second channel packet switching mode.

7. An adapter as set forth in claim 4, wherein said packet switching means includes said first timer means.

8. An adapter as set forth in claim 1, wherein said packet switching means includes said first timer means and said second timer means.

9. An adapter as set forth in claim 1, further comprising an OR circuit connected to said first timer means and said second timer means.

10. An integrated service digital network (ISDN) terminal adapter for connecting a terminal and an ISDN, comprising:

packet switching means, operatively connected to said terminal and said ISDN, for establishing data communication by packet switching;

circuit switching means, operatively connected to said terminal and said ISDN, for establishing data communication by circuit switching;

selecting means, operatively connected to said packet switching means and said circuit switching means, for selecting one of said packet switching means and said circuit switching means; and timer means, operatively connected to said packet switching means and said selecting means, for counting a time period from a first time corresponding to transmitting a data packet to a second time corresponding to receiving an acknowledgment of receipt of the data packet after said packet switching means establishes said data communication by packet switching, and said timer means controlling said selecting means to select said circuit switching means when the time period exceeds a first value.

11. An adapter as set forth in claim 10, further comprising:

time-to-speed conversion unit, operatively connected to said timer means for converting the time period into a speed of data transmission; and display unit, connected to said time-to-speed conversion unit, for displaying the speed of data transmission.

12. An adapter as set forth in claim 11, further comprising manual control unit, operatively connected to said selecting means, for controlling said selecting means.

13. An adapter as set forth in claim 10, wherein said packet switching means comprises:

packet assembly/disassembly means, operatively connected to said first timer means, for controlling said first timer means;

link access protocol balanced processing means, operatively connected to said packet assembly/disassembly means, for processing data packets in a first channel packet switching mode; and second channel protocol processing means, operatively connected to said packet assembly/disassembly means, for processing said data packets in a second channel packet switching mode.

14. An adapter as set forth in claim 13, wherein said packet switching means includes said timer means.

15. An integrated service digital network (ISDN) terminal adapter for connecting a terminal and an ISDN, comprising:

packet switching means, operatively connected to said terminal and said ISDN, for establishing data communication by packet switching;

circuit switching means, operatively connected to said terminal and said ISDN, for establishing data communication by circuit switching;

selecting means, operatively connected to said packet switching means and said circuit switching means, for selecting one of said packet switching means and said circuit switching means; and timer means, operatively connected to said packet switching means, for counting a time period during which no response is received after said packet switching means establishes data communication by packet switching, time-to-speed conversion unit, operatively connected to said timer means, for converting the time period into a speed of data transmission; and display unit, connected to said time-to-speed conversion unit, for displaying the speed of data transmission.

16. An adapter as set forth in claim 15, further comprising manual control unit, operatively connected to said selecting means, for controlling said selecting means.

17. An adapter as set forth in claim 15, wherein said packet switching means comprises:

packet assembly/disassembly means, operatively connected to said first timer means, for controlling said first timer means;

link access protocol balanced processing means, operatively connected to said packet assembly/disassembly means, for processing data packets in a first channel packet switching mode.

18. An adapter as set forth in claim 17, wherein said packet switching means further comprises second channel protocol processing means, operatively connected to said packet assembly/disassembly means, for processing said data packets in a second channel packet switching mode.

19. An adapter as set forth in claim 17, wherein said packet switching means includes said timer means.

* * * * *